(12) United States Patent
Long et al.

(10) Patent No.: US 7,150,288 B2
(45) Date of Patent: Dec. 19, 2006

(54) CONTROL VALVE APPARATUS

(75) Inventors: Charles F. Long, Pittsboro, IN (US); Darren J. Weber, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 362 days.

(21) Appl. No.: 10/809,059

(22) Filed: Mar. 25, 2004

(65) Prior Publication Data

US 2005/0211295 A1    Sep. 29, 2005

(51) Int. Cl.
*G05D 7/01* (2006.01)
*B60K 6/04* (2006.01)

(52) U.S. Cl. ............ 137/112; 137/625.69; 137/565.29; 60/405; 60/429; 475/5; 903/926

(58) Field of Classification Search ................ 137/111, 137/112, 625.25, 625.66, 625.69; 903/926, 903/945, 946; 475/5, 116; 60/405, 429, 60/430
See application file for complete search history.

(56) References Cited

U.S. PATENT DOCUMENTS

| | | | |
|---|---|---|---|
| 2,358,228 A * | 9/1944 | Hoof | 137/113 |
| 2,811,979 A * | 11/1957 | Presnell | 137/112 |
| 4,684,004 A * | 8/1987 | Stark | 192/87.13 |
| 5,002,170 A * | 3/1991 | Parsons et al. | 477/86 |
| 5,101,941 A * | 4/1992 | Long et al. | 188/290 |
| 5,119,914 A * | 6/1992 | Dadel et al. | 192/85 R |
| 5,319,949 A * | 6/1994 | Long et al. | 60/347 |
| 5,911,244 A * | 6/1999 | Long et al. | 137/625.64 |
| 6,257,268 B1 * | 7/2001 | Hope et al. | 137/112 |
| 6,382,248 B1 * | 5/2002 | Long et al. | 137/557 |
| 6,871,129 B1 * | 3/2005 | Kitaori et al. | 701/51 |
| 6,913,558 B1 * | 7/2005 | Mori et al. | 477/3 |

* cited by examiner

*Primary Examiner*—Ramesh Krishnamurthy
(74) *Attorney, Agent, or Firm*—Dan L. Thompson

(57) ABSTRACT

A control for parallel hybrid transmission has a valve mechanism, which is operable to supply fluid pressure to a torque-transmitting mechanism with or without the operation of the vehicle engine. The valve mechanism is responsive to an electrically driven pump to supply fluid pressure whenever the engine is discontinued and the electric driven pump is operated.

3 Claims, 3 Drawing Sheets

CONTROL VALVE APPARATUS

TECHNICAL FIELD

This invention relates to control valves for power transmissions and, more particularly, to control valves for maintaining at least one torque-transmitting mechanism engaged when the main power plant operation is discontinued.

BACKGROUND OF THE INVENTION

Vehicles include an engine, a transmission, and drive wheels. More recently, it has been proposed to use what is known as a hybrid transmission wherein the vehicle powertrain includes an engine, a transmission, and drive wheels with the transmission incorporating one or more electric motors which assist in driving the vehicle or can drive the vehicle while the internal combustion engine is inoperable.

These types of powertrains have the benefit in that they reduce vehicle emissions and improve the overall fuel economy of the vehicle. This is mainly accomplished by allowing the engine to stop or discontinue operations under certain conditions.

In at least one hybrid transmission or powertrain, a parallel hybrid transmission is incorporated. In the parallel hybrid transmission, power is supplied by the internal combustion engine and by the electric motors, which are independently connected to drive members. Power from the vehicle engine is delivered to the transmission, which transfers the power to the drive wheels. One or more motor/generators are incorporated into the transmission and connect through energy storage devices such as batteries. The energy storage device can either accept power from or supply power to each of the motor/generators.

An onboard computer is used to synchronize the power flow from the engine and/or the motor/generators to the transmission output. In order to provide better efficiency over a wide range of applications, it is desired to permit discontinuation of operation of the internal combustion engine during certain modes of operation such as coasting, low speed operation, and stopping in traffic, or for other purposes. By discontinuing the engine operation during these instances, the inefficiency and emissions of the vehicle are greatly reduced. However, when the engine operation is discontinued, the control fluid for the transmission is also discontinued which can result in slower startup operation of the transmission and/or require one of the electric drive motors to also drive a pump which would require the drive motor to be operated during these operating conditions. It would be of great advantage to maintain the range clutch or torque-transmitting mechanism of the transmission engaged during these operations when the engine operation is discontinued.

SUMMARY OF THE INVENTION

It is an object of the present invention to provide an improved powertrain having a control valve apparatus for controlling fluid flow to a torque-transmitting mechanism under operating conditions when the vehicle engine is not running.

In one aspect of the present invention, an electric pump is driven during stoppage of the vehicle engine to supply fluid pressure to a control valve apparatus.

In another aspect of the present invention, the control valve apparatus is connected to both an engine supply pump and to the electric driven pump.

In yet another aspect of the present invention, the torque-transmitting mechanism is energized by the engine driven pump when the engine is in operation.

In still another aspect of the present invention, the torque-transmitting mechanism is engaged by the electrically driven pump when the engine driven pump operation is discontinued.

In a further aspect of the present invention, the electric driven pump also provides lubrication fluid for the power transmission when it is supplying fluid to the torque-transmitting mechanism.

In a yet further aspect of the present invention, the torque-transmitting mechanism is supplied with a sufficient pressure level to maintain engagement prior to the lubrication circuit being supplied by the electric pump.

The present invention will permit the parallel hybrid transmission with two or more modes to be completely powered from energy storage devices, an electric pump, and a torque-transmitting mechanism, which are incorporated into a conventional parallel hybrid transmission control system. The electric pump supplies oil to the torque-transmitting mechanism during full electric operation and a control valve transitions feed to the torque-transmitting mechanism between the engine pump and the electric pump. The control valve is actuated as pressure from the electric pump is supplied.

Under normal operating conditions, when the vehicle engine is running, a mechanical pump connected with the engine supplies oil to operate the power transmission torque-transmitting mechanism. The oil from the engine pump flows to the hydraulic controls, which regulates the oil pressure and delivers oil to the various systems of the transmission. When a particular range is commanded, oil is sent from the hydraulic control through the valve apparatus and then to the torque-transmitting mechanism. During this operating procedure, the electric pump is not used and the control valve is in a closed position, which permits engine-supplied oil to be delivered to the torque-transmitting mechanism. A pressure switch within the feed line issues a diagnostic check signal that the torque-transmitting mechanism is receiving pressurized fluid.

When it is desired to discontinue vehicle engine operation and permit full electric mode operation, the energy storage devices are commanded to power the electric pump. As the electric pump begins to supply fluid, a pressure is developed in the circuit, which acts on the control valve. When the pressure is sufficiently high, it overcomes a resilient force on the control valve, and the valve opens to permit fluid flow from the electric pump to the torque-transmitting mechanism. When the torque-transmitting mechanism pressure has been satisfied, the valve opens more fully to permit a supply of fluid to the lubrication circuit.

DESCRIPTION OF AN EXEMPLARY EMBODIMENT

Figure 1:
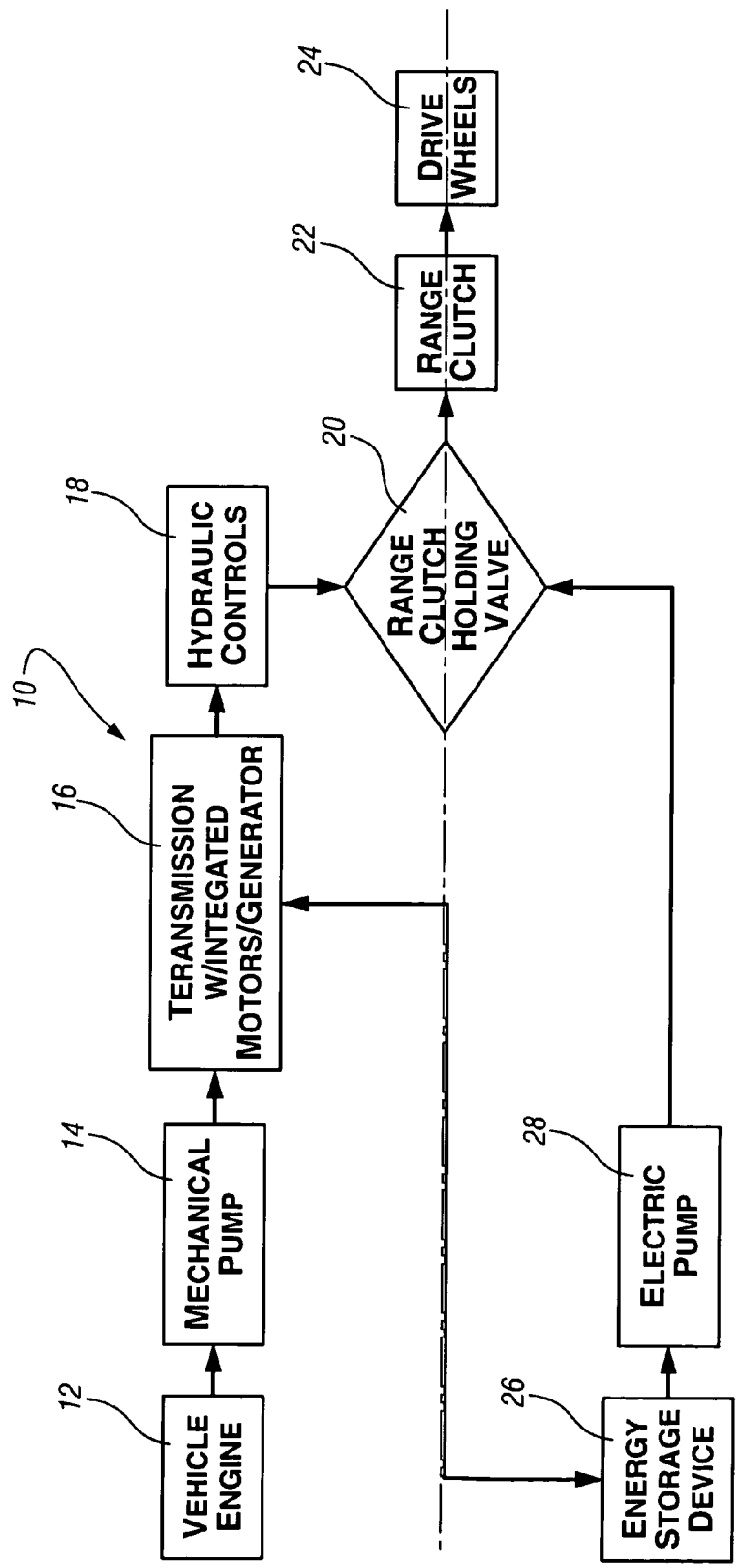
FIG. 1 is a schematic diagram of a powertrain incorporating the present invention.

Referring to the drawings, wherein like characters represent the same or corresponding parts throughout the several views, there is seen in FIG. 1 a schematic representation 10 of a vehicle powertrain. This includes a vehicle engine 12, a mechanical supply pump 14, a hybrid transmission 16 having integrated motor/generators, a hydraulic control system 18, a clutch control valve 20, which may be incorporated within the hydraulic control system 18, a range clutch or torque-transmitting mechanism 22, which is engaged continuously during at least one mode of operation, drive wheels 24, which provide traction drive for the vehicle, energy storage devices 26, and an electric pump 28.

Both the electric pump 28 and the mechanical pump 14 are well known devices and supply fluid pressure to operate various control functions in their normal operating conditions. The energy storage device 26 is a conventional electrical system, such as batteries. The transmission 16 is a conventional parallel hybrid transmission, which is well known in the art. The vehicle engine 12 is a conventional internal combustion mechanism. The hydraulic control system 18 includes conventional control valves, which provide hydraulic fluid flow and pressure to various parts of the powertrain. The control valve 20 is shown diagrammatically in FIGS. 2 through 5.

The valve 20 includes a valve body 30 and formed therein a valve bore 32. The valve bore 32 is in fluid communication with the engine pump 14 to a passage 34, with the torque-transmitting mechanism 22 to a passage 36, with the electric pump 28 to passages 38 and 40, with a transmission lube circuit 42 through a passage 44, and with a plurality of exhaust connections 46.

A valve spool 48 is slidably disposed within the valve bore 32 and has two equal diameter lands 50 and 52 and a smaller diameter land 54. The valve spool 48 is biased by a spring 56 or other conventional resilient mechanism to a spring set position shown in FIG. 2 wherein an end 58 of the valve spool 48 abuts the end of bore 32. In the spring set position shown, the valve land 50 blocks the passage 40 and therefore oil delivery from the electric pump 28. A space between the valve lands 50 and 52 provides torque communication between passages 34 and 36 such that the engine driven pump supplies fluid pressure to the torque-transmitting mechanism 22. This space between the valve lands 50 and 52 is also communicated with a sensor switch 60, which is a diagnostic tool indicating to the control system that the torque-transmitting mechanism 22 is receiving fluid pressure. The valve land 54 is smaller than the valve lands 50 and 52 and seals the passage 44 from the passage 38 in the spring set position shown.

Figure 3:
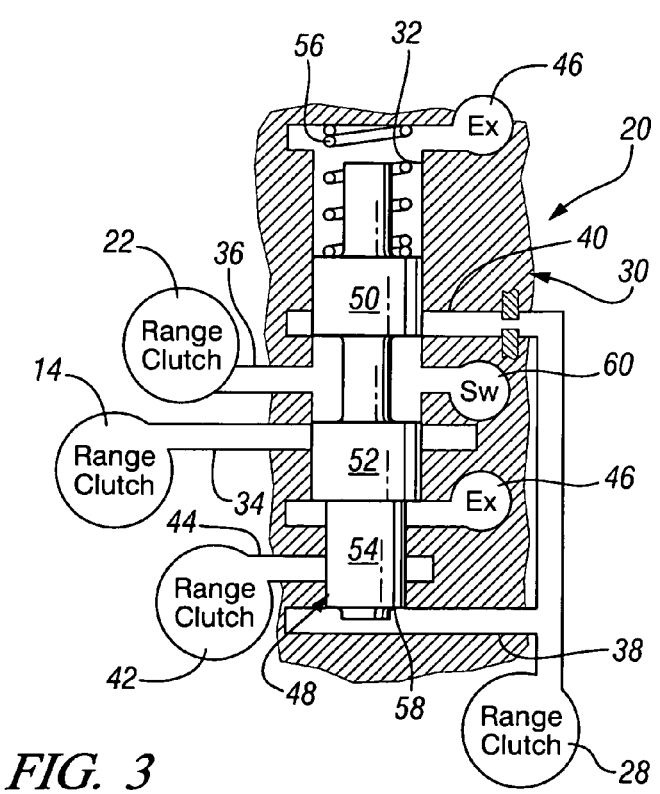
FIG. 3 is a view similar to FIG. 2 showing the control valve mechanism in a transition mode of operation.

In FIG. 3, it is assumed that the engine pump 14 has discontinued operation and the electric pump 28 has begun operation. As the electric pump 28 supplies fluid pressure, the end 58 of the valve spool 48 is pressurized through the passage 38 and the valve spool 48 begins upward movement against the force in the spring 56. During this upward movement, the valve land 50 opens the passage 40 to the space between valve lands 50 and 52 to permit fluid pressure from the electric pump 28 to reach the torque-transmitting mechanism 22. Also, the diagnostic sensor switch 60 is pressurized by fluid from the electric pump 28 at this time. The valve land 52 disconnects the passage 34 from the space between the valve lands 50 and 52 since at this time the engine operation has been discontinued and there is no fluid pressure in the passage 34.

Figure 4:
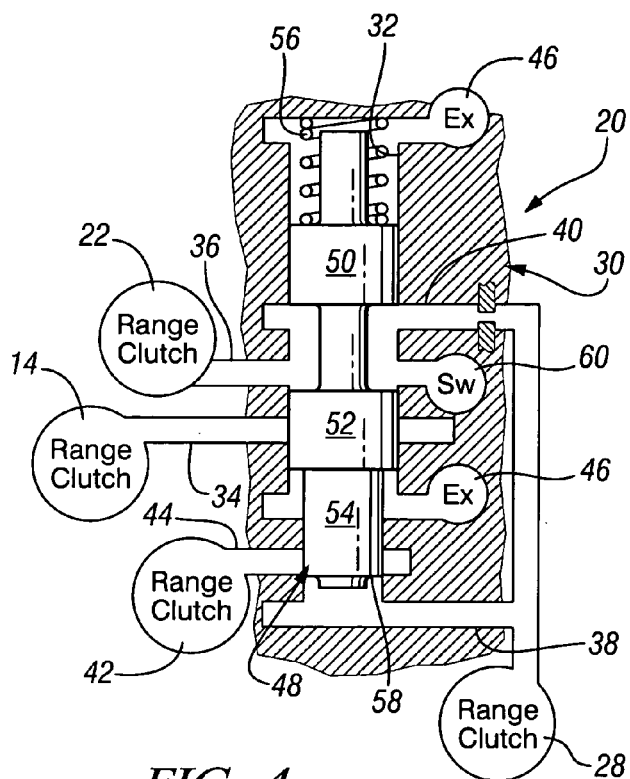
FIG. 4 is a view similar to FIG. 2 showing the control valve in an electric mode of operation.
Figure 5:
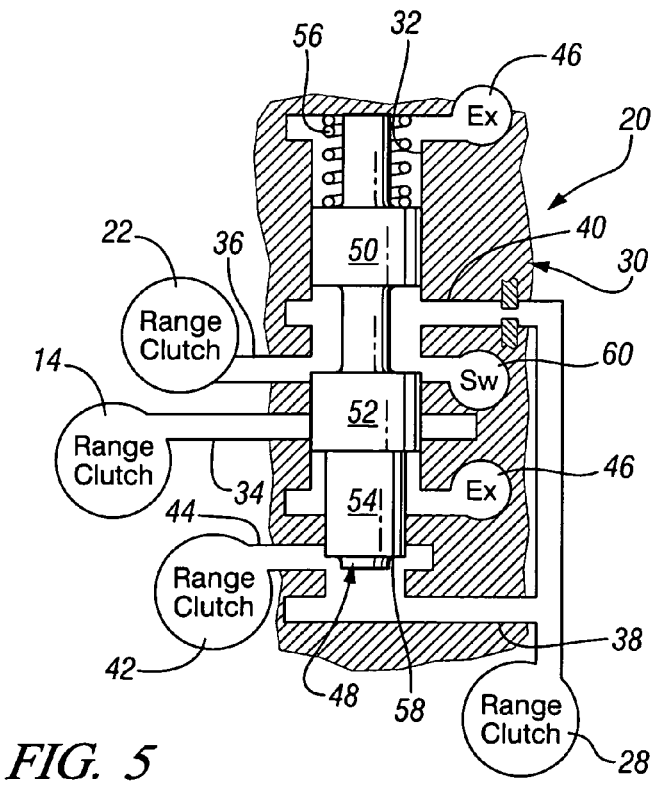
FIG. 5 is a view similar to FIG. 2 showing the control valve in a fully operated condition.

As the electric pump 28 is operated, the fluid pressure therein continues to build or to increase until the valve spool 48 reaches the position shown in FIG. 4. At this point, the torque-transmitting mechanism 22 has a full operating pressure imposed thereon and the valve land 54 begins to open the passage 38 to the lubrication circuit 42 through the passage 44. Further increase in the pressure from the electric pump 28 causes the valve spool 48 to assume the position shown in FIG. 5 wherein the lubrication circuit 42 is receiving additional fluid from the electric pump 28. At this point, the valve spool 48 is acting as a regulator valve limiting any further pressure increases in the passages 40 and 38. Also at this time, the fluid pressure to the torque-transmitting mechanism 22 is fully developed such that the torque-transmitting mechanism 22 is fully engaged. This will permit the hybrid transmission to be in an operating condition such that on restarting of the engine 12, the vehicle is ready to be propelled thereby, or on operation of the motor/generators in the hybrid transmission 16, the transmission is prepared to be operated in at least one mode of operation such as through electric drive. Under these conditions, the vehicle may also be operated as a hybrid vehicle with both the engine and the motor/generators supplying power to the vehicle drive wheels.

Figure 2:
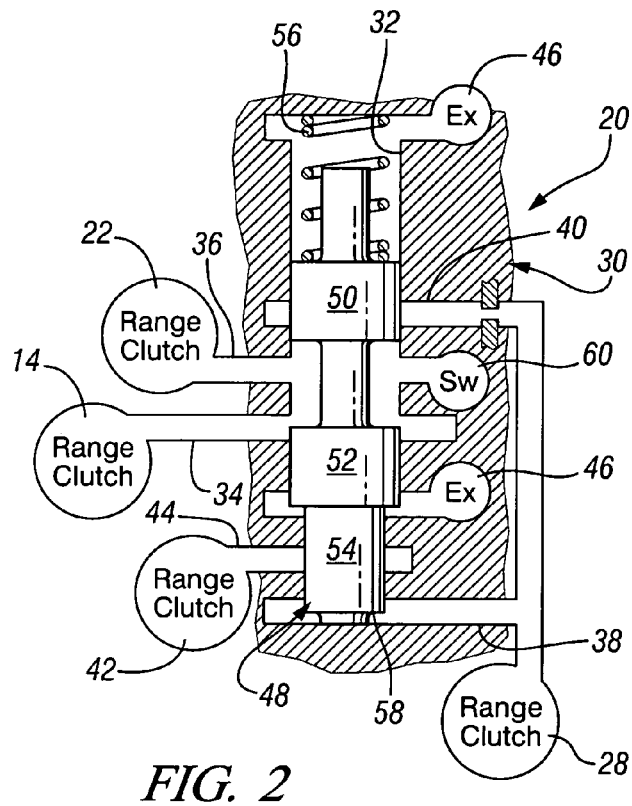
FIG. 2 is a diagrammatic representation of a control valve incorporating the present invention with the system shown in engine mode operation.

When the engine 12 is restarted, fluid pressure at the pump 14 will be generated and the control system for the powertrain will signal the electric pump to discontinue operation such that the valve spool 48 will be returned to the position shown in FIG. 2 wherein the engine pump 14 supplies the fluid pressure for the torque-transmitting mechanism 22. Those skilled in the art will recognize that the engine pump 14 also supplies fluid pressure to a number of other systems when operating such as lubrication systems and some other control circuits which are not required for a single range of operation which takes place during full electric drive.

The invention claimed is:

1. A control valve apparatus for controlling fluid flow to a torque-transmitting mechanism comprising:
    a first source of fluid pressure;
    a second source of fluid pressure;
    a valve body having fluid connections with said first source of fluid pressure, said second source of fluid pressure, and said torque-transmitting mechanism;
    a valve member disposed in said valve body and being either resiliently positioned therein to direct fluid pressure from said first source to said torque-transmitting mechanism or pressure positioned therein to connect said second source to said torque-transmitting mechanism and discontinue fluid flow from said first source;
    said valve body has a fluid connection with a lubrication circuit; and
    said lubrication circuit is supplied with fluid from said second source after said second source supplies a predetermined pressure to said torque-transmitting mechanism.

2. The control valve apparatus defined in claim 1 further wherein:
    said first source is an engine driven pump and said second source is an electric motor driven pump.

3. The control valve apparatus defined in claim 1 further wherein:
    a sensor means is subjected to fluid pressure at said torque-transmitting mechanism when either said first source or said second source is operable.

* * * * *